May 16, 1961  G. A. LAUGHTON  2,984,247
CONTAINERS FOR TOILET SALVES AND THE LIKE
Filed April 16, 1959

2,984,247
Patented May 16, 1961

2,984,247
CONTAINERS FOR TOILET SALVES AND THE LIKE

George Abe Laughton, Henley-in-Arden, England, assignor to Laughton & Sons Limited, Birmingham, England, a British company Filed Apr. 16, 1959, Ser. No. 806,947

Claims priority, application Great Britain May 17, 1958

3 Claims. (Cl. 132—79)

The invention relates to containers for toilet salves, such for example as lip salves which are commonly put up as a stick placed in a cartridge or holder.

The object of the invention is to provide a container having a mirror attached to it and having an open end and resilient means within it tending to eject the cartridge or holder of the salve when a means for closing the open end of the container, which means is arranged on the mirror, is moved away. When the cartridge is inserted in the container and the mirror is moved into an out of use position near the container, the means carried by it for closing the open end of the container moves into place. If the mirror is moved away from the container ready for use, the closure means moves with it and the resilient means causes the cartridge or holder to project from the container where it can be readily gripped by the fingers and removed for use.

A preferred embodiment of construction is illustrated in the drawings.

Figure 1:
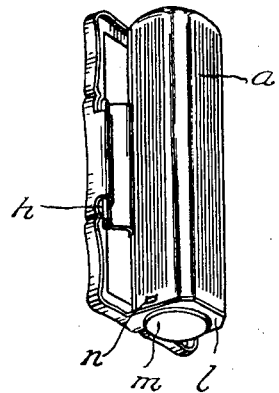
Figure 1 is a perspective view of a salve stick container and mirror in out of use position.

In these drawings $a$ is the container into which a stick of salve $b$, placed in a cartridge or holder $c$, can be inserted. The holder $c$ with the stick $b$ is pushed into a thin walled sleeve $d$ provided with an internal shoulder $e$ against which a compression spring $f$ bears. $g$ is a bracket secured to the wall of the container $a$ and providing at its outer edge hinge lugs $h$ between which a hinge lug $i$ on a frame $j$ of a small mirror $k$ is mounted in a manner permitting the mirror to be moved close against one wall of the container $a$. The mirror frame carries at one end a closure plate $l$ projecting perpendicularly from it. When the mirror is moved to an out of use position as in Figure 1 and the holder $c$ of the stick of salve $b$ is in its container $a$, the closure plate $l$ on the mirror frame closes the end of the container and retains the holder and stick. The insertion of the holder $c$ brings it into the interior of the thin walled sleeve $d$ and causes it to move inwardly into the container thereby compressing the spring $f$ which urges the sleeve towards the closure plate and holds the latter and the mirror in place in the closed position with the stick holder $c$ bearing on the closure plate.

Preferably the closure plate is recessed on its upper surface as at $m$ and the end of the stick holder engages in the shallow recess to assist in the holding of the parts in the out of use position.

The interengaging parts on the closure plate and the stick holder constitute a detent for releasably holding the closure plate in closed position.

Figure 4:
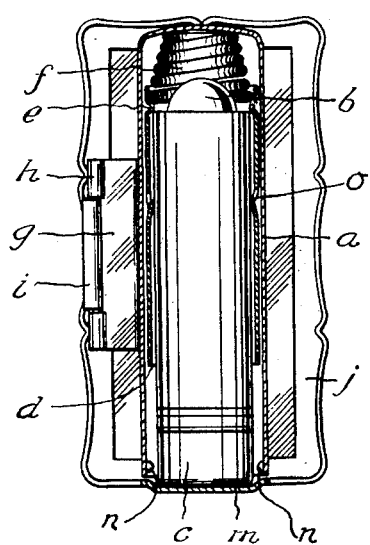
Figure 4 is a view drawn to a larger scale with parts in section.
Figure 2:
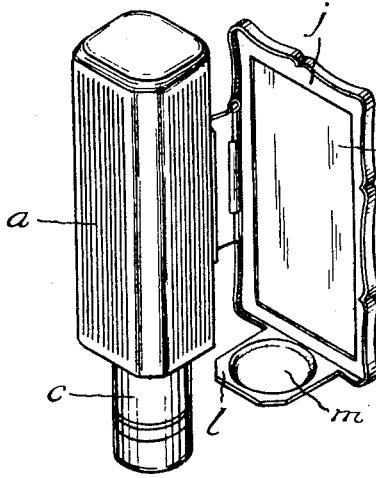
Figure 2 is a similar view of the device opened for use and with the stick holder partially ejected from its container.
Figure 3:
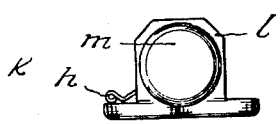
Figure 3 is an end view looking at the lower end of Figure 1.

The spring-pressed sleeve $d$ arranged within the container $a$ is prevented from displacement from the container $a$ by means such as internal projections $n$ formed or secured in the wall of the container near its open end, see Figure 4.

In order to prevent the stick holder $c$ being loose in the sleeve $d$ the latter may be provided as shown in Figure 4 with inwardly depressed tongues $o$ for bearing lightly on the exterior of the holder. The holder may in any case be provided with the well known propelling means for causing the nose of the stick to be projected for use and withdrawn into the holder when not in use.

I claim:

1. In combination a tubular container for receiving a cartridge of toilet salve, a mirror frame hingedly connected to the side wall of said container on an axis parallel with the axis of the tubular container, the tubular container being closed at one end and open at the other, a sleeve part slidably mounted within said container, a spring housed in the closed end of the container and resisting the inward movement of said sleeve, means in the container for preventing the displacement of the sleeve part from the container, a holder for containing the salve and being removably mounted in said sleeve part, tongues in the wall of the sleeve part for yieldingly gripping the removable holder containing the salve; a closure plate on the mirror frame projecting perpendicularly from the frame into a position where it will close the open end of the container when the mirror is in an out of use position against the wall of the container, and by the engagement between the salve holder and the plate on the mirror both are held in an out of use position.

2. A container for a stick of dispensable material comprising, in combination, a cartridge containing said stick, a housing for said cartridge comprising a tubular body closed at one end and open at the other end for removably receiving said cartridge, a spring mounted in the closed end of said housing and resisting inward movement of said cartridge, an elongated plate-like frame, means for hinging the side wall of said tubular housing to said frame on a pivotal axis adjacent and parallel to one longitudinal edge of said frame, said tubular housing being located at the center of said frame when said frame is in contact with said housing and being movable about said pivotal axis to a position to one side of said frame, and a closure wall for the open end of said tubular housing rigidly mounted on said frame at right angles to the plane thereof and located in a position to close the open end of said tubular housing when said frame engages the wall of said housing said cartridge and said closure wall being provided with inter-engaging parts to form a detent for releasably holding said closure plate in the closed position, the movable part of said detent being carried by said cartridge and being urged against the co-operating detent parts carried by said closure plate by the action of said spring.

3. A container for toilet salve comprising, in combination, a hollow body closed at one end and open at the other, a sleeve part slidable within the hollow body, a tubular holder for toilet salve receivable within said sleeve part, a spring within the hollow body opposing inward movement of the sleeve and the salve holder within it and serving to force the sleeve towards the open end of the container, means within the sleeve for resiliently bearing on the salve holder and holding it when the sleeve reaches the end of its permitted movement thereby causing an end of the salve holder to project to an extent enabling it to be readily gripped by the fingers and removed for use, a frame, a mirror in the frame, a hinge connection between the frame and the side wall of the container on an axis parallel with the longitudinal axis of said body, and a closure plate projecting perpendicularly from the mirror frame in a position enabling it to close the open end of the container when the mirror is in an out of use position adjacent said body, said closure plate having a depression in its surface which depression is towards the open end of the container and will receive the outer end of the tubular holder of the salve and under the spring force acting on the sleeve part the salve holder will by its engagement with the depression on the closure plate retain said plate in a position to close the open end of the container.

References Cited in the file of this patent

UNITED STATES PATENTS

| | | |
|---|---|---|
| 2,049,378 | Holl | July 28, 1936 |
| 2,094,006 | O'Moore-Farrell | Sept. 28, 1937 |
| 2,294,257 | Udvarhely et al. | Aug. 25, 1942 |
| 2,825,345 | Gellman | Mar. 4, 1958 |

FOREIGN PATENTS

| | | |
|---|---|---|
| 270,991 | Switzerland | Dec. 16, 1950 |